(12) United States Patent
Prytz

(10) Patent No.: US 10,300,444 B2
(45) Date of Patent: May 28, 2019

(54) HYDRO NANO-GAS REACTOR

(71) Applicant: Hydroatomic Inst/Informationstjänst i Solna AB, Farsta (SE)

(72) Inventor: Sven-Erik Prytz, Lidingö (SE)

(73) Assignee: Hydroatomic Inst/Informationstjänst I Solna AB, Farsta (SE)

( * ) Notice: Subject to any disclaimer, the term of this patent is extended or adjusted under 35 U.S.C. 154(b) by 16 days.

(21) Appl. No.: 15/574,388

(22) PCT Filed: May 15, 2015

(86) PCT No.: PCT/SE2015/000030
§ 371 (c)(1),
(2) Date: Nov. 15, 2017

(87) PCT Pub. No.: WO2016/186536
PCT Pub. Date: Nov. 24, 2016

(65) Prior Publication Data
US 2018/0133674 A1 May 17, 2018

(51) Int. Cl.
  *B01J 7/02* (2006.01)
  *C01B 3/04* (2006.01)
  *C01B 13/02* (2006.01)
  *C11D 11/00* (2006.01)
  *C23G 5/00* (2006.01)

(52) U.S. Cl.
  CPC ............... *B01J 7/02* (2013.01); *C01B 3/042* (2013.01); *C01B 13/0207* (2013.01); *C11D 11/0029* (2013.01); *C23G 5/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,141,604 | A * | 8/1992 | Ayers | B01J 4/04 204/252 |
| 2004/0247522 | A1* | 12/2004 | Mills | B01J 19/088 423/648.1 |
| 2006/0060464 | A1* | 3/2006 | Chang | H05H 1/2406 204/164 |
| 2008/0296171 | A1* | 12/2008 | Davidson | C25B 1/04 205/639 |

(Continued)

OTHER PUBLICATIONS

Dharmaraj CH et al, "Economical hydrogen production by electrolysis using nano pulsed DC", International Journal of energy and environment, 2012 3(1), 129-136, whole doc; abstract.

(Continued)

*Primary Examiner* — Kaity V Chandler
(74) *Attorney, Agent, or Firm* — Fasth Law Offices; Rolf Fasth

(57) ABSTRACT

The hollow reactor housing contains a catalytic plate positioned within the reactor housing. The plate is constructed of alloys of at least two of Grafen®, other carbon alloys, steel, platinum, and titanium. Lids tightly close both ends of the housing. The plate has at least two electrodes attached thereto that protrude through one of the lids. The housing includes deionized water. An electronic high-power pulse generator is connected to the two electrodes feeding pulses in the frequency region of nanometer to the catalytic plate.

4 Claims, 2 Drawing Sheets

(56) References Cited

U.S. PATENT DOCUMENTS

Figure 1:
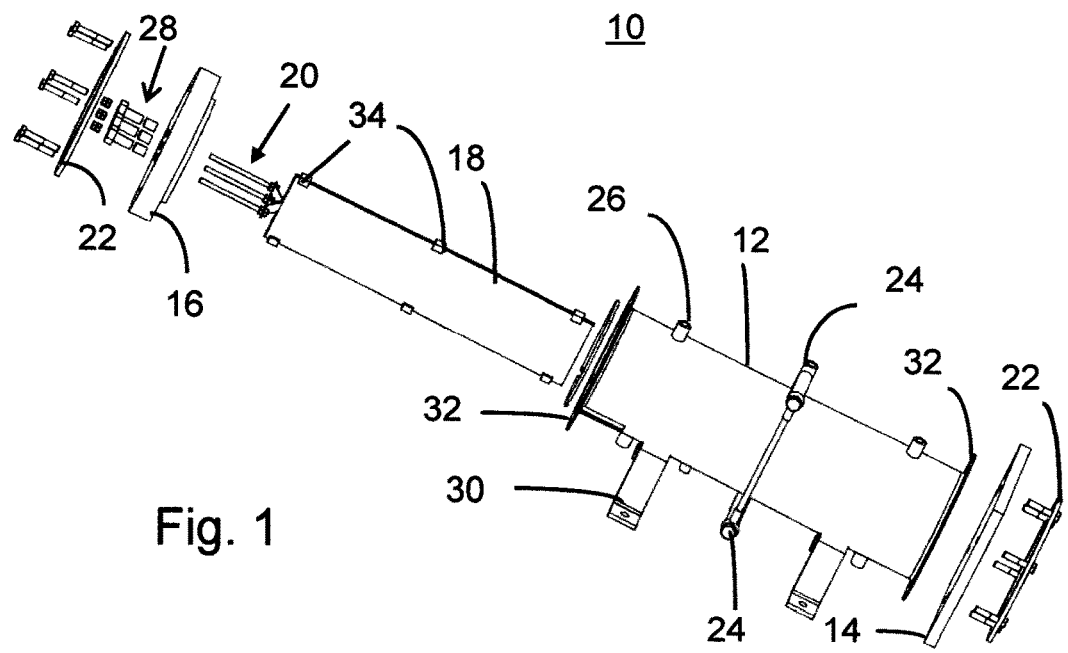

| | | | | |
|---|---|---|---|---|
| 2008/0296172 A1* | 12/2008 | Davidson | .................. | C25B 1/04 205/639 |
| 2009/0092540 A1* | 4/2009 | Stehl | ..................... | C01B 5/00 423/580.1 |
| 2009/0098421 A1* | 4/2009 | Mills | ..................... | C01B 3/02 429/489 |
| 2009/0123789 A1* | 5/2009 | Cooper | ..................... | B01J 20/20 429/440 |
| 2010/0084282 A1* | 4/2010 | Ganley | ..................... | C25B 1/04 205/631 |
| 2011/0070510 A1* | 3/2011 | McAlister | ................. | C01B 3/22 429/422 |
| 2011/0114075 A1* | 5/2011 | Mills | ..................... | C01B 3/00 126/263.01 |
| 2011/0257275 A1* | 10/2011 | McAlister | ................. | C01B 3/24 518/702 |
| 2012/0067021 A1* | 3/2012 | Aggelopoulos | .......... | C25B 1/08 60/39.12 |
| 2013/0001094 A1* | 1/2013 | Cable | ................... | H01M 14/00 205/340 |
| 2013/0180861 A1* | 7/2013 | Podlaha-Murphy | ........................ | B01J 21/063 205/76 |
| 2013/0259798 A1* | 10/2013 | Carey | ..................... | C01B 3/068 423/648.1 |
| 2016/0031710 A1* | 2/2016 | Noyes | .................. | B01J 23/8892 423/447.3 |
| 2016/0175802 A1* | 6/2016 | Gourley | ................. | C01B 3/042 204/156 |
| 2016/0281243 A1* | 9/2016 | Gomez | ................... | C25B 15/02 |
| 2016/0290223 A1* | 10/2016 | Mills | ......................... | C01B 3/00 |
| 2017/0067170 A1* | 3/2017 | Hansen | ..................... | C25B 9/08 |

OTHER PUBLICATIONS

Shimizu, Naohiro et al, "A novel method of hydrogen generation by water electrolysis using an ultra-short-pulse power supply" Journal of applied electrochemistry, 2006, 36, 419-323, whole doc; abstract.

Vanags, Martins et al, "Water electrolysis with inductive voltage pulses", Electrolysis, edited by Vladimir Linkov, 2012, p. 19-43, ISBN 978-953-51-0793-4; whole doc; abstract.

Tabazah, T et al, "Utilization of water produced hydrogen for domestic heating purposes", Int J. of Thermal and Environmental engineering, 2014, 7 (2), 95-99; whole doc; abstract.

Yilmaz, Ali Can et al, "Effect of hydroxy (HHO) gas addition on performance and exhaust emissions in compression ignition engines", Int. J. of Hydrogen Energy XXX, 2010, 1-7; whole doc; abstract; p. 95.

* cited by examiner

HYDRO NANO-GAS REACTOR

PRIOR APPLICATIONS

This is a US national phase patent application that claims priority from PCT/SE2015/000030 filed 15 May 2015.

TECHNICAL FIELD

The present invention pertains to a hydro nano-gas reactor system generating a reactive mixture of hydrogen nano-gas, and a utilization of the gas.

BACKGROUND ART

The Nobel 1986 Nobel Prize in Chemistry was shared by three physical chemists. Two, Dudley R. Herschbach and Yuan T. Lee, were supported in their research by Basic Energy Sciences. The Prize was awarded for discoveries that helped to explain the physical dynamics of chemical reactions.

Professor Yuan T. Lee, who shared the 1986 Nobel Prize in Chemistry shows the design for his crossed molecular beam experiment described in the story beginning on page 27 of "Basic Energy Sciences: Summary of Accomplishments" (DOE/ER-0455P, May 1990). The purpose of this experiment was to study the chemical reaction of sodium atoms with oxygen molecules. In the experiment, a beam of sodium atoms and a beam of oxygen molecules which intersect in a vacuum.

Products of the sodium-oxygen reaction are ionized by laser radiation aimed at the point of intersection of two beams so that the products can be detected and measured by a mass spectrometer. By tuning the wavelength of the laser, specific products of the chemical reaction can be identified and measured. By moving the position of the mass spectrometer, the spatial distribution of the reaction products can be determined. Through control of the sources of the atoms and molecules, reactants in specific can be selected for study, as in the case of the 4D state of the sodium.

Utilizing instruments such as these, chemists have been able at last to study chemical reactions in great quantitative detail. From these studies is emerging a fuller understanding of chemical reactions, and an improved ability to control them for the benefit of society.

The benefits of modern chemistry so profoundly affect our daily lives that it is difficult to imagine a world without them. Yet, despite all this progress, man's basic understanding of the most fundamental aspects of chemical reactions is just beginning to yield to the scientists' probes.

Specifically, it was revealed how two molecules undergoing a chemical reaction collide, combine and transform themselves, step by step, into very different resultant products. Although the reactions studied were comparatively simple and straightforward, the insights gained revolutionized prevailing thought.

From the point of view of chemical reaction dynamics, the $19^{th}$ century way of writing down chemical reactions, using arrows and symbols, is misleading. The equations obscure which aspects of chemical reactions are important and which ones are not. If one looks at the reactions in a different light, as did Herschbach and Lee, focusing instead on particular structures of certain atomic electrons and orbitals, the pieces of the puzzle begin to fall into place. Striking similarities stand out among their experimental data. These form a relatively small number of "rules" which govern chemical reactions and their dynamics. These, in turn, can be generalized to other molecules and other reactions.

With this knowledge, it may be possible ultimately to manipulate, using a variety of control mechanisms, the timing, speed, sequence, extent, and very nature of chemical reactions, attended by virtually unlimited variations and possibilities. The specifics may be appreciated by visualizing a chemical reaction. Imagine, for a moment, an immensely enlarged, slow-motion picture of one atom, potassium (K), and one molecule, methyl iodide (CHJ), hurtling toward each other through the vacuum of a laboratory chamber on a collision course set by the scientists to result in a glancing blow.

In some cases, the expected chemical reaction takes place with the explosive formation of two by-products, potassium iodide (KI) and an incomplete methyl group (CH,), flying off in opposite directions. In other cases, the collision results in no chemical reaction, with the original constituents, called reactants, simply bouncing off each other in a physically expected distribution of random directions. By varying the velocities and angles of the incoming reactants, and by measuring and determining the distributions of the resulting products, researchers were able to infer the necessary and sufficient conditions under which the reaction would take place. In the case studied, the incoming potassium atom had to strike the opposing methyl iodide molecule on the iodide end, and then bounce backward.

Over the years, the experimental devices used to analyze the reactions became more sophisticated and the kinds of reactants and reactions studied became more complex. Gradually, the data began to reveal patterns and similarities, even though the molecular structures of the varying reactants appeared to be quite different. This led to what Herschbach called the "harpoon" model of reaction dynamics.

One molecule sneaks up on the other, uses a very specific valence electron orbital as its harpoon, spears its target in one selective and vulnerable spot, and hauls it in. Once these mechanisms are known, many of the other potentially obscuring complexities of molecular shapes, bonds, and electron potentials, fall away as being irrelevant. The experimental technique used in these studies, developed by Herschbach and Lee, is today known as "crossed-molecular beam" research. The facility recently constructed at Lawrence Berkeley Laboratory, under Lee's direction and with continued support from Basic Energy Sciences, is widely acclaimed as the best molecular beam instrumentation facility in the world.

In recent years, this facility enabled Lee to study more complex molecules, such as those having long hydrocarbon chains. Pioneering exploration was begun in two key areas of pressing national interest-hydrocarbon (oil and natural gas) combustion and atmospheric chemistry. With these advances, understanding chemistry from first principles is now a practical goal. Its applicability extends beyond fuel burning and ozone depletion.

Insights gained using crossed-molecular beam research may yield new models of how catalysts operate in specific chemical reactions. Because the velocities of molecular collisions, which determine reaction potentials, are related to temperature, the nature of reaction rates is now a subject of detailed and quantifiable research.

Perhaps more importantly, crossed-molecular beam research permits a better understanding of reaction intermediates, the short-lived arrangements of atoms and molecules that are the first results of a molecular collision, but which soon decay to some other or more stable forms. Manipulating the reaction intermediates offers one of the best hopes for precisely controlling chemical reactions and, thus, determining the nature of the final reaction products.

For Herschbach and Lee, more than two decades of fundamental research culminated in the Nobel Prize. They envisioned and devised a productive experimental approach, built and perfected the necessary hardware and instruments, gathered data with sufficient variety and scope to yield robust conclusions, and presented the scientific community with a wholly new view of chemistry and the dynamics of reactions.

Crossed-molecular beam research is now firmly established as a fundamental research tool. It is being used in a growing number of inquiries. With expanding knowledge, focused more on applications, improved understanding of reaction dynamics and, perhaps, the ability to control the reactions themselves, move closer to reality.

Despite all the wondrous advances of modern chemistry, new frontiers remain to be explored. Crossed-molecular beam research lies at the forefront of this endeavor, with great potential for continuing contributions to industry, health, and environment.

The former is an excerpt from "Yuan T. Lee's Crossed Molecular Beam Experiment, Office of Basic Energy Sciences": http://web.archive.org/web/20000902074635/www-.er.doe.gov/production/bes/YuanLee_Exp.html (4 of 4) Apr. 7, 2006 2:46:13 PM.

In NAOHIRO SHIMIZU et al., Journal of Applied Electrochemistry (2006) 36:419-423: A novel method of hydrogen generation by water electrolysis using an ultra-short-pulse power supply is disclosed. The present invention does not concern electrolysis, but catalyzing.

SUMMARY OF THE INVENTION

The present invention regards a hydro nano-gas reactor system generating a highly flammable reactive mixture of hydrogen gas, and other gases defined in the below, and a utilization of the gas, which relates to the findings excerpt above. But not to the utilization of a laser to crossbeam molecules, more too high energy electric pulses involving a catalyst, and deionized water. The applicant of the present invention has a test laboratory, which confines the teaching in the description of the present invention.

Hence, the present invention sets forth a hydro nano-gas reactor system generating a reactive mixture of hydrogen gas, comprising:

a hollow reactor housing containing a catalytic plate constructed of alloys of at least two of Grafen®, other carbon alloys, steel, platinum, and titanium;

lids tightly closing both ends of the housing;

the plate having at least two electrodes attached, the electrodes protruding through one of the lids, and the housing being filled with deionized water;

an electronic high power pulse generator being connected to the at least two electrodes feeding pulses in the frequency region of nanometer to the catalytic plate, and of a high voltage, the catalytic plate reacting with the water through the pulses by resonance vibrations and electromagnetic pulse charging, and thus producing the reactive mixture of hydro nano-gas, the gas being a structured vaporized ionized water, hydrogen, and oxygen gas; and at least one of a water scrubber storing the generated mixture of hydro nano-gas, and gas tubes to store the clean produced gas.

In one embodiment of the present invention the reactor housing is connected to at least one other reactor housing, the reactor housings producing the reactive gas.

Furthermore, the present invention sets forth a method adapted to a hydro nano-gas reactor system generating a reactive mixture of hydrogen gas, comprising the steps of:

utilizing a hollow reactor housing containing a catalytic plate constructed of alloys of at least two of Grafen®, other carbon alloys, steel, platinum, and titanium;

having lids tightly closing both ends of the housing;

the plate having at least two electrodes attached, the electrodes protruding through one of the lids, and the housing being filled with deionized water;

utilizing an electronic high power pulse generator being connected to the at least two electrodes feeding pulses in the frequency region of nanometer to the catalytic plate, and of a high voltage, the catalytic plate reacting with the water through the pulses by resonance vibrations and electromagnetic pulse charging, and thus producing the reactive mixture of hydro nano-gas, the gas being a structured vaporized ionized water, hydrogen, and oxygen gas; and storing in at least one of a water scrubber the generated mixture of hydro nano-gas, and gas tubes to store the clean produced gas in ionized water.

Moreover, the present invention sets forth a utilization of the mixture of hydro nano-gas according to claims 1, and 2. Thus, the utilization comprises at least one of the following applications:

the reactive mixture of hydro nano-gas to remove soot in a combustion engine;

the reactive mixture of hydro nano-gas to remove soot from metal, and metal alloys:

the reactive mixture of hydrogen nano-gas to decarbonize fluid;

the reactive mixture of hydrogen nano-gas to remove soot my mixing it with a soot flame; and the reactive mixture of hydro nano-gas mixed with a cast of material to provide a smooth surface of the cast.

A BRIEF DESCRIPTION OF THE DRAWINGS

Figure 2:
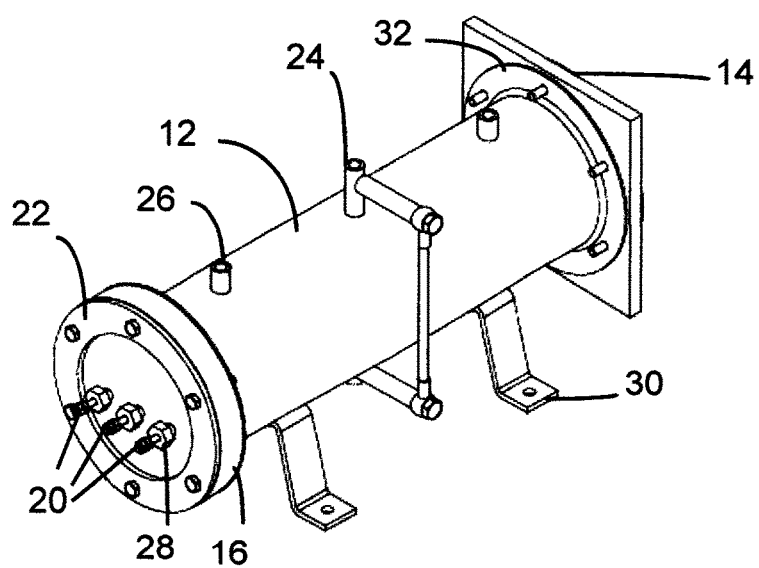
Figure 3:
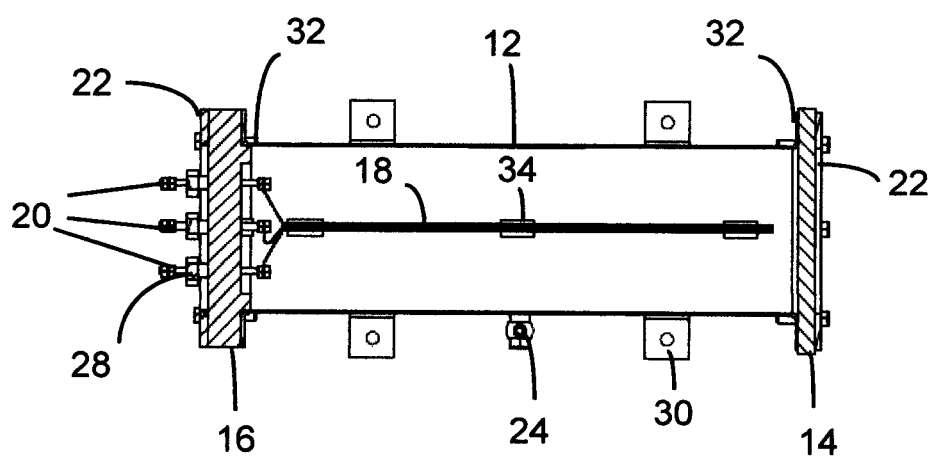

Henceforth, reference is had to the accompanying drawings throughout the present description for a better understanding of the present inventions embodiments, and given examples, wherein:

FIG. 1 schematically illustrates a perspective view of a disassembled gas reactor, in one embodiment, in accordance with the present invention;

FIG. 2 schematically illustrates the assembled gas reactor of FIG. 1, in one embodiment, according to the present invention; and FIG. 3 schematically illustrates a cross section of the gas generator in FIGS. 1 and 2, in accordance with the present invention.

DETAILED DESCRIPTION OF PREFERRED EMBODIMENTS

The present invention, as mentioned, relates to a hydro nano-gas reactor system generating a highly flammable reactive mixture of hydro nano-gas, and a utilization of the gas. But not to the utilization of a laser to crossbeam molecules, more to high energy electric pulses involving a catalyst, and deionized water. The applicant of the present invention has a test laboratory, which confines the teaching in the description of the present invention. By for instance igniting the generated gas making up a very hot flame an engine/motor piston covered with a layer of soot was fast and entirely cleaned from the sot when the piston was exposed to the flame. Furthermore, a flame with sot exposed to the ignited gas, the flame was sot free in an instance.

A casting of concrete containing a mixture with the gas in water produced a smooth surface much like a marble stone surface without being polished. Also, when the gas contained in water is mixed with diesel, the carbon is eliminated from the exhaust gas.

HydroNanoGas, HNG, as the product is named is not really a pure gas in the ordinary sense. HNG is produced in a process where pure ionized water is the base of the HNG reactor. HNG is a mixture of structured vaporized ionized water and hydrogen and oxygen are loosely connected in a sustainable open structure that can be stored under pressure as HNG bubbling water.

Thus, there is no other chemical constituents. This nano-gas vapor can be distributed cold on a hot plate or flame, which immediately creates a combustion reaction with speeds in excess of 9000 meters per second and temperatures between one and three thousand degrees C.°. The final product can be catalyzed by means of affiliated catalysts in different versions depending on the aim of the end product.

HNG reactors special nano-patterned plates, alloys described below, are in an ionized water bed surrounded by the condensed stainless metal plates of mixed materials. The water is generated in the reactor and has a similarity with Deuterium/heavy water.

HNG production takes place with resonance vibrations and electromagnetic pulse charging. The nano-plates process starts with a carefully calculated natural frequency and electromagnetic pulses that release HNG-bubbles from the nano-plates fixed surface particles. A catalytic reaction starts which releases HNGs evaporation mixed gas components. The systems liquid contains plus and minus charges.

With a catalytic process reference is had to that no consumption/appointment is made of electrolytic chemicals and that no material consumption takes place. Nano-plates are intact despite thousands of hours of production. Through the resonance-pulse-wave process, the energy consumption is low compared to HNG-bubbles energy reactive power.

HNG bubbling water in the fuel cells increases efficiency beyond traditional values. Hydrogen and oxygen molecules form stable clusters but also reactive compounds which can be kept under pressure for many years in tubes, which also contains the ionized water. On release of pressure HNG behaves as a reactive gas, where the introduction of a single combustion results in a highly efficient combustion and an ionized water vapor that can be reused in the reactor.

HNG is a structured form of oxygen-hydrogen Ion$H_2O$— With custom nano-patterns HNG clusters can be formed for different applications. From applications in the medical field for the activation of different liquids. As Oxygen-rich drinking water with protection against bacteria and recovery of agriculture. Involvement in oil and coal/carbon fuels with high clean combustion results. As the after-burning of fumes from coal and oil power plants eliminate the smokes toxic emissions and pure $CO_2$ can be extracted for industrial and agricultural purposes for example in paper production, greenhouses etc.

HNGs nano-bubbles can be stored in water and added to the sea/aquariums/fish farms for the production of an enhanced microbiological cleansing fauna as a result. HNG in a water based mixture of concrete provides a molecular concrete structure resembling marble that is as elastic as steel with increased durability against weather, wind etc.

Nano bubbled ionized water can condense titanium by shrinkage, which retains the original symmetrical surface at 38 c. The mixture in combusted fuel gives way as diesel, gasoline, enabling combustion to become cleaner and more efficient.

It is not a clean HNG gas that is produced, but a composite mixture of at least three components. Those components are variations of hydrogen, oxygen, and ionic deuterium water humidity, where the components are the base for how the gas behaves in a reaction without being a carrier of energy. The relation of the gas components to a certain note become catalytic in its own strength if the components are in balance. Hereby, the resonance synchronizes with the power of electromagnetism and sound waves, which produce reversible electrons back to the source catalytic plate between waves created by the pulse generator while the nano-bubbles are stable in the water. The hydrogens are creating HNG clusters, which provides space for a vortex reaction in a flame, i.e. the flame becomes absorbed close to 2000 times in nano-second fractions to be seen in the flame when cold (non heated or room temperature HNG) HNG is mixed with for instance flame containing soot, The power of such a reaction can be study as a partial cold fusion.

A sample from the nature are the PISTON SCRIMPS, which create a bubble and use it as a weapon to catch a target when hunting. Reference is had to YouTube and a BBC study proven to create a heat equal to 4000° C. in short moments https://www.youtube.com/watch?v=QXK2G2AzMTU.

FIG. 1 schematically illustrates a perspective view of a disassembled gas reactor 10, in one embodiment, in accordance with the present invention. Hereby, the gas reactor 10 has in one embodiment of the present invention a cylindrical hollow housing 12 with two lids/caps 14, 16, whereby the housing 12 and lids are manufactured out of a metallic material or alloys of metal, carbon fiber not being excluded. A catalytic reactive plate 18 is provided inside the housing 12, which is manufactured out of for instance alloys between Grafen, other carbon alloys, steel, platinum, titanium and other possible alloys of refined materials in the same category. This plate 18 has three electrodes 20 attached to it in one embodiment; the electrodes protrude fluid-tight out of the lid 16. A bracket 22 sealing the lids 14,16, fluid-proof-tight to the housing 12 through bolts and spaces to a flange 32 on the housing 12.

The electrodes are inducing pulses in the frequency region of nanometers, and amplitudes around one million volt or more as synchronized frequencies in the nano-region, and at a high voltage around 1 million V or more.

Furthermore, the housing has attached to it a conduit gas outlet 24, through which gas is fed to a water scrubber (not shown) and/or to gas tubes (not shown) for storing purposes. There are also depicted in FIG. 1 inlets and/or outlets 26 to fill the housing with fluid such as deionized water and/or to connect the reactor 10 to one or more reactors 10. The inlets/outlets 26 are plugged when not in use. Also depicted in FIG. 1 are the tubes 28 through which the electrodes 20 protrude, which are fluid-tight sealed. The reactor 10 can also be equipped with standings/footings 30 for a stabile fastening on for instance a stand.

In FIG. 2 is schematically illustrated, the assembled gas reactor 10 of FIG. 1, in one embodiment, according to the present invention. The electrodes/terminals 20 are connected to a high power electric pulse generator (not shown), which pulses are intermittently fed to the electrodes 20, and to the reactive plate 18, whereby the plate catalyzes the ionized water to release a mixture of hydro nano-gas. Thereafter the hydro nano-gas is stored in a water scrubber or in gas tubes for utilization.

Moreover, FIG. 3 schematically illustrates a cross section of the gas reactor 10 in FIGS. 1 and 2, in accordance with the present invention.

Furthermore, the present invention provides a utilization of the mixture of hydro nano-gas produced/generated. Hereby, it comprises at least one of the following applications:

the stored scrubber water and the reactive mixture of gas, and combustion fuel;

the reactive mixture of hydro nano-gas to remove soot in a diesel engine;

the reactive mixture of hydro nano-gas to remove soot from metal, and metal alloys;

the reactive mixture of hydro nano-gas to decarbonize fluid;

the reactive mixture of hydro nano-gas to remove soot by mixing it with a sot flame; and the reactive mixture of hydro nano-gas mixed with a cast of material to provide a smooth surface of the cast. Many more utilization/application of the gas is possible within the scope of the attached utilization claims.

The attached set of claims determines other possible embodiments of the present invention to a person skilled in the art of the present technical field.

While the present invention has been described in accordance with preferred compositions and embodiments, it is to be understood that certain substitutions and alterations may be made thereto without departing from the spirit and scope of the following claims.

The invention claimed is:

1. A hydro nano-gas reactor apparatus comprising:
a hollow reactor housing containing a catalytic plate positioned within the reactor housing, wherein the plate is constructed of alloys of at least two of Grafen®, other carbon alloys, steel, platinum, and titanium;
lids tightly closing both ends of the housing;
said plate having at least two electrodes attached thereto, said electrodes protruding through one of said lids, said housing including deionized water; and
an electronic high power pulse generator being connected to said at least two electrodes feeding pulses in the frequency region of nanometer to said catalytic plate, and of a high voltage, said catalytic plate reacting with said water through said pulses by resonance vibrations and electromagnetic pulse charging, and thus producing a reactive mixture of hydro nano-gas, said hydro nano-gas being a structured vaporized ionized water, hydrogen, and oxygen gas.

2. A system according to claim 1, wherein the system comprises at least one of a water scrubber and gas tubes for storing said generated mixture of hydro nano-gas.

3. A method for producing a hydro nano-gas, comprising the steps of:
utilizing the hydro nano-gas reactor of claim 1,
wherein said housing being filled with deionized water; and
utilizing an electronic high power pulse generator being connected to said at least two electrodes feeding pulses in the frequency region of nanometer to said catalytic plate, and of a high voltage, said catalytic plate reacting with said water through said pulses by resonance vibrations and electromagnetic pulse charging, and thus producing said reactive mixture of hydro nano-gas, said gas being a structured vaporized ionized water, hydrogen, and oxygen gas.

4. The method according to claim 3, wherein the method further comprises the step of storing, in at least one of a water scrubber and gas tubes, said generated mixture of hydro nano-gas.

* * * * *